(12) United States Patent
Schmidt et al.

(10) Patent No.: US 7,894,598 B2
(45) Date of Patent: Feb. 22, 2011

(54) SYSTEM FOR LIMITING RECEIVE AUDIO

(75) Inventors: Gerhard Uwe Schmidt, Ulm (DE); Tim Haulick, Blaubeuren (DE); Clarence Chu, Vancouver (CA); David Giesbrecht, Vancouver (CA)

(73) Assignee: Nuance Communications, Inc., Burlington, MA (US)

( * ) Notice: Subject to any disclaimer, the term of this patent is extended or adjusted under 35 U.S.C. 154(b) by 1612 days.

(21) Appl. No.: 11/012,079

(22) Filed: Dec. 14, 2004

(65) Prior Publication Data
US 2006/0126822 A1 Jun. 15, 2006

(51) Int. Cl.
*H04M 9/08* (2006.01)
(52) U.S. Cl. .................................. 379/406.07
(58) Field of Classification Search ............. 379/406.07
See application file for complete search history.

(56) References Cited
U.S. PATENT DOCUMENTS 5,263,020 A * 11/1993 Yatsuzuka et al. .......... 370/289
5,680,450 A   10/1997 Dent et al. ................... 379/388
6,744,882 B1 * 6/2004 Gupta et al. ............ 379/387.01
6,766,176 B1 * 7/2004 Gupta et al. ............. 455/550.1

FOREIGN PATENT DOCUMENTS

WO  WO 2004/107724 A2  12/2004

\* cited by examiner

*Primary Examiner*—Alexander Jamal
(74) *Attorney, Agent, or Firm*—Sunstein Kann Murphy & Timbers LLP

(57) ABSTRACT

A system for limiting a received audio signal in a communication system is provided. The receive audio signal is limited prior to being played over a loudspeaker to insure that the loudspeaker output will not be clipped when picked up by a nearby microphone associated with the communication system. By preventing clipping of the loudspeaker output at the microphone, the transfer function of the loudspeaker-enclosure-microphone system remains linear, facilitating accurate echo cancellation in the communication system.

29 Claims, 4 Drawing Sheets

SYSTEM FOR LIMITING RECEIVE AUDIO

BACKGROUND OF THE INVENTION

Technical Field

The invention provides improved echo cancellation in a communication system. In many communication systems, such as speakerphones or hands-free mobile telephones in automobiles, audio signals are received from a remote location and played over a loudspeaker. Conversely, sounds made locally are picked up by one or more microphones placed in the local environment in the vicinity of the loudspeaker. Audio signals transduced by the microphone(s) are transmitted back to the remote location where they are played out for the benefit of a remote party at the opposite end of the communication. Typically, the loudspeaker will be located very near the microphone. In many cases, output from the loudspeaker may be picked up by the microphone and sounds that actually originated at the remote location may be incorporated into the audio signal that are transmitted back to the remote location. As a result, the remote party may hear an echo, slightly delayed, of what he or she has already spoken. This type of acoustic echo can greatly impair the quality of the communications between the parties.

Echo cancellation is employed in communication systems to remove the loudspeaker output from the microphone pick-up signal. Typical echo cancellation systems use the Line-Out signal used to drive the loudspeaker as a reference for estimating what the loudspeaker output will look like after it has been played over the loudspeaker, traveled through the local environment; picked up by the microphone, and transduced back into an electrical audio signal. The echo signal estimate is then subtracted from the microphone pick-up signal. The closer the match between the echo signal estimate in the actual echo signal transduced at the microphone, the more accurate and complete the echo cancellation will be.

Echo cancellation is typically a linear proposition. Variations in the loudspeaker output will be reflected in the microphone pick-up signal in a predictable manner. Complications arise, however, when non-linearities are introduced in the loudspeaker-enclosure-microphone (LEM) system. A common problem in echo cancellation systems is when the loudspeaker is placed too close to the microphone or when at the loudspeaker output is played too loud. In either case, the volume of sound present at the microphone may exceed the capabilities of the pick-up stage of the communication system. Excessive volume at the microphone may cause clipping, either at the microphone itself or at the A/D gain stage. When the loudspeaker output is clipped due to excessive volume, it becomes impossible for the echo cancellation system to predict the actual echo signal that will be transduced at the microphone. Such non-linearities in the LEM transfer function render it impossible to effectively remove echo from the microphone pick-up signal.

Accordingly, there is a need for an improved system for providing echo cancellation in communication systems. The need is especially great in communication systems where the loudspeaker will be located very near the microphone. The need is further increased when the communication system is to be located in a confined space such as an office or automobile where there are many nearby surfaces that can reflect the loudspeaker output back toward the microphone. An improved echo cancellation system must be capable of anticipating loudspeaker output volumes that will lead to clipping at the microphone and limit the loudspeaker output to levels below an output power threshold at which clipping begins to occur. By selectively limiting the loudspeaker output, the loudspeaker dynamic range can be limited to the linear region of the LEM system's transfer function. Without the non-linearities caused by clipping of the loudspeaker out signal acoustic loudspeaker echo can be effectively removed from the microphone pick-up signal.

SUMMARY

This invention provides a system for limiting a received audio signal in a communication system for the purpose of improving acoustic echo cancellation. The invention is especially well adapted for use in communication systems that include a loudspeaker for playing audio signals received from a remote source, a microphone for transducing local sounds, and a transceiver for sending and receiving audio signals to and from a remote device.

A system according to the invention acts to selectively limit received audio signals before they are played over the loudspeaker in order to ensure that the sound output from the loudspeaker is not clipped at the microphone when the loudspeaker output is picked up by the microphone. Clipping at the microphone injects non-linearities into the loudspeaker enclosure microphone system transfer function which prevent satisfactory echo cancellation. By maintaining the loudspeaker output within a range known not to cause clipping, effective echo cancellation can be performed using traditional methods.

In addition to a transceiver, a loudspeaker, and a microphone, a communication system employing the present invention may also include an adaptive echo cancellation filter for removing the loudspeaker output from the microphone pickup signal to eliminate acoustic echo. A soft limiter is provided in the signal path of the received audio signal to selectively limit the received audio signal as needed. A low order infinite impulse response (IIR) filter models the LEM system transfer function and using the received audio signal as a reference generates an estimate of the echo signal that will be picked up by the microphone when the received audio signal is played over the loudspeaker. A short term power estimate is calculated from the echo signal estimate and is used to determine whether the received audio signal, if played over the loudspeaker, will cause clipping at the microphone. If so, the gain on the soft limiter is adjusted in order to attenuate the received audio signal sufficiently so that the loudspeaker output will not be clipped at the microphone.

The invention also encompasses an improved method of canceling acoustic echo in a communication system. According to the improved method, when an audio signal is received, a short-term power estimate is generated based on the received signal. The short-term power estimate corresponds to the estimated audio power that would be received at the microphone were the received audio signal to be played over the loudspeaker without limitation. The short-term power estimate is then compared to a known power threshold, above which signals will be clipped by the microphone. If the short-term power exceeds the clipping threshold, the received audio signal is limited such that the audio power output by the loudspeaker and received at the microphone will fall below the known clipping threshold.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
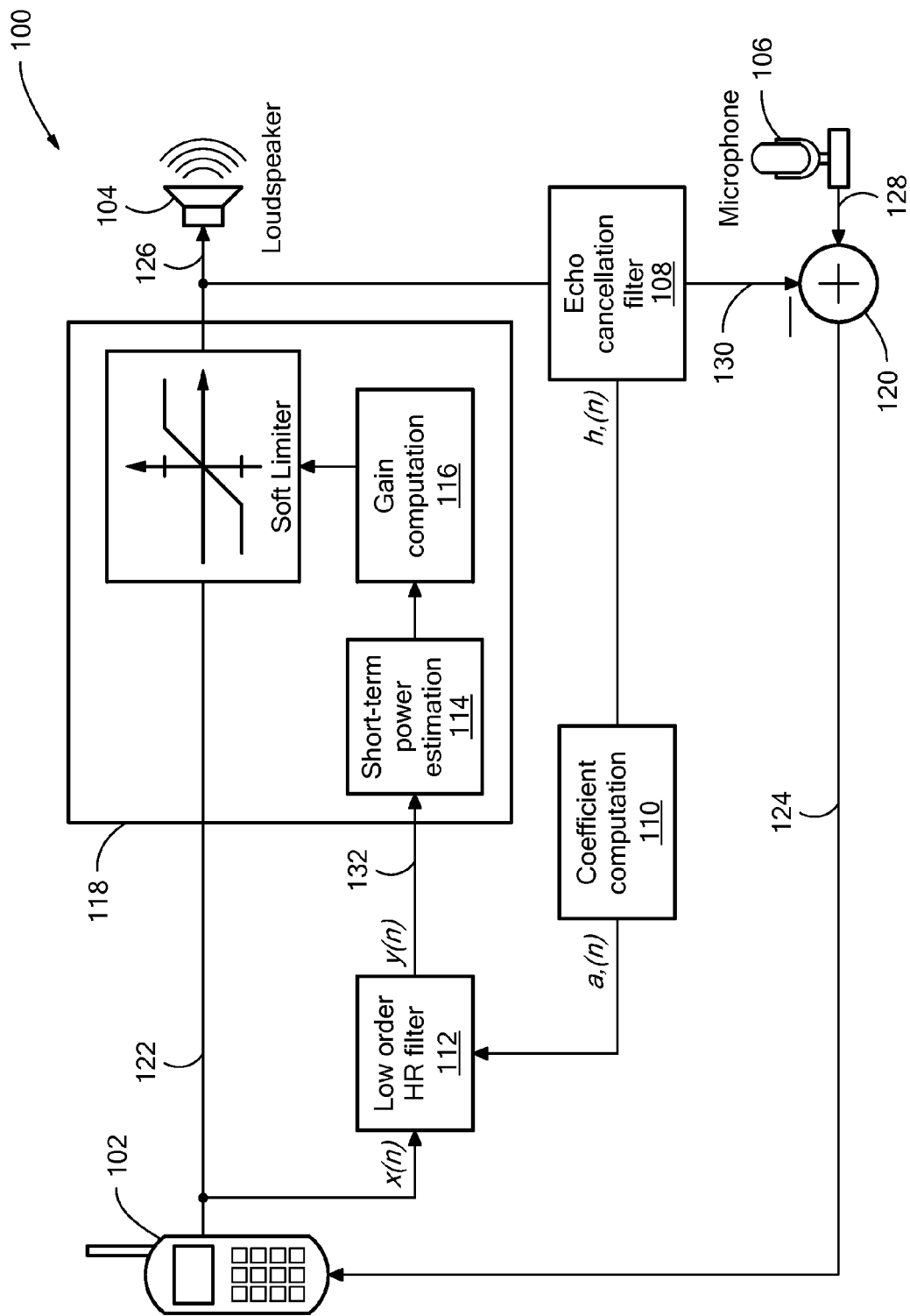
FIG. 1 is a block diagram of a communication system employing a received audio limiter for improved echo cancellation.

This invention relates to improved echo cancellation in communications systems. A communications system 100 employing an improved echo cancellation system according to the invention is shown in FIG. 1. Communication system 100 includes a transceiver 102, a loudspeaker 104, and a microphone 106. Transceiver 102 is adapted to send and receive audio signals to and from similar remote transceiver devices. When transceiver 102 is engaged in a communication session with another remote transceiver, the two transceivers provide two-way communication between a local party associated with transceiver 102 and a remote party associated with the remote transceiver. Transceiver 102 may be, for example, a mobile telephone, a speaker-phone base unit, or some other device for providing two-way communications between local and remote parties. Audio signals received from the remote device are played over loudspeaker 104. Sounds picked up by microphone 106 are transduced into audio signals that are transmitted by transceiver 102 back to the remote device. Thus, the local and remote parties can audibly communicate with one another using communication system 100.

As has been described, the problem of echo arises in communications systems like communication system 100 when the output from loudspeaker 104 is picked up by microphone 106 and is re-transmitted back to its original source. The resulting echo heard by the remote party can have a significant negative impact on the quality of the communication experienced by the two parties.

Echo cancellation filter 108 is provided to remove the effects of the loudspeaker 104 output from the audio signal transduced by microphone 106. Echo cancellation filter 108 is an adaptive filtered that models the characteristics of the loudspeaker-enclosure-microphone (LEM) system. Using the Line-Out signal 126 used to drive the loudspeaker 104, the echo cancellation filter 108 mimics the impulse response of the LEM system. Echo cancellation filter 108 creates an echo signal estimate 130 that represents the audio signal expected to be transduced by microphone 106. Echo cancellation filter 108 creates the echo signal estimate 130 based on the reference signal and the known characteristics of the LEM system. The echo signal estimate 130 is subtracted from the actual microphone pick-up signal 128 at summing junction 120.

Ideally, the echo signal estimate 130 will exactly match the actual echo signal picked up by microphone 106. In this case, when the echo signal estimate 130 is subtracted from the microphone pick-up signal 128, the residual error signal will be zero and the loudspeaker echo will be completely eliminated from the transmit audio signal 124 sent transmitted by transceiver 102 to the remote transceiver at the opposite end of the communication. In most cases the echo signal estimate 130 will not exactly match the actual echo signal. The coefficients of the adaptive echo cancellation filter 108 must be recalculated frequently to improve and maintain the echo cancellation filter's model of the LEM system. The difference between the echo signal estimate and the actual echo signal forms an error signal that may be fed back into the adaptive echo cancellation filter 108 and used to recalculate the filter's coefficients and refine the echo cancellation filter's model of the LEM system. Once the adaptive echo cancellation filter's coefficients have been calibrated, the echo from the loudspeaker 104 output will be substantially eliminated from the transmit audio signal 124. Thus, when the transmit audio signal 124 is received by the remote transceiver and re-produced for the remote party, the remote party will hear only the sounds that originated with the local party. All traces of echo will have been substantially removed.

The echo cancellation features of communications system 100 described to this point are effective so long as the transfer function of the echo response path of the LEM system remains linear. If the loudspeaker output reaching the microphone is too great for the microphone to handle, however, the echo signal received by microphone 106 may be clipped. Non-linearities resulting from clipping at microphone 106 make it impossible for the echo cancellation filter 108 to predict the echo signal that will actually incorporated into the microphone pick-up signal 128. In this case, because the echo cancellation filter 108 can no longer accurately predict what the loudspeaker echo signal will be, it cannot effectively remove the loudspeaker echo from the microphone pick-up signal 128. A direct result of nonlinearities in the LEM system's transfer function is that echo can creep back into the audio transmit signal 124.

Figure 2:
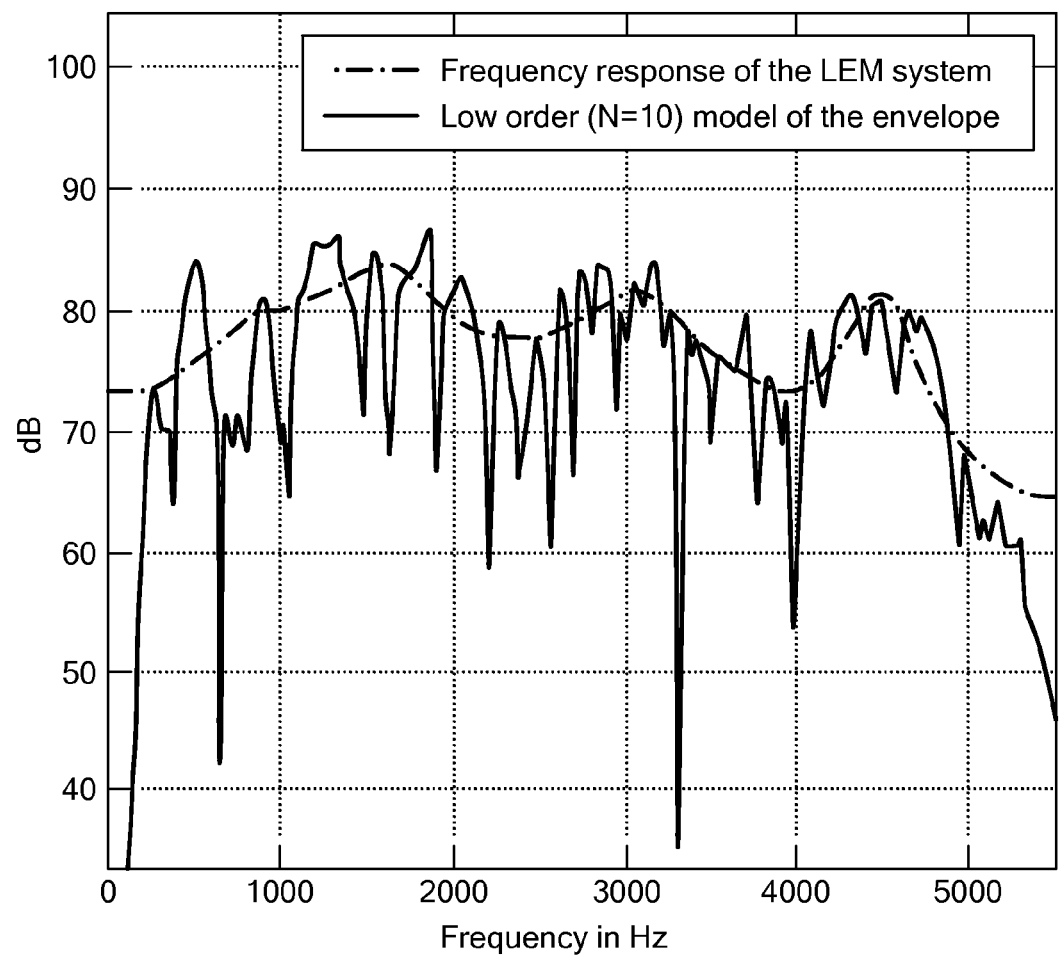
FIG. 2 is a chart comparing the frequency response of a loudspeaker-enclosure-microphone system, and a low order spectral model of the loudspeaker-enclosure-microphone system of an infinite impulse response filter.

Communications system 100 solves this problem by limiting the output of loudspeaker 104 to levels which are known not to cause clipping at microphone 106. Soft limiter 118 is placed in the signal path of the received audio signal 122 to limit the dynamic range of the Line-Out signal 126 and thus control the volume out of loudspeaker 104. Soft limiter 118 is controlled by the output of a low order infinite impulse response (IIR) filter 112. The low order IIR filter 112 models the gain and spectral envelope of the LEM system. As will be described below, the coefficients of the low order IIR filter 112 are derived from the echo cancellation filter 108. To save processing time and resources, the IIR filter's spectral model of the LEM system need only be a course representation of the true frequency response of the LEM system. For example, FIG. 2 shows a comparison of the frequency response of an LEM system measured by an adaptive echo cancellation filter such as adaptive echo cancellation filter 108, and a low order (N=10) model of the spectral envelope of the same LEM system as generated by a low order infinite impulse response filter such as IIR filter 112. As can be seen, the first curve 200 is characterized by sharp peaks any steep declines. This level of detail in modeling the frequency response of the LEM system is necessary to accurately and completely remove loudspeaker echo from the microphone pick-up signal. The second curve 202 is much smoother than the detailed frequency response curve 200, but nonetheless maintains the same general shape as the detailed frequency response curve

200. This coarser model is sufficient to estimate the power of the loudspeaker output that will reach microphone 106 for purposes of limiting the loudspeaker output.

Returning to FIG. 1, low order IIR filter 112, like echo cancellation filter 108, outputs a loudspeaker output estimate signal 132 that represents an estimate of the loudspeaker output that will be picked up by microphone 106. Of course, since the IIR filter's model of the LEM system is less precise than the echo cancellation filter's 108 model, loudspeaker output estimate 132 will be a much rougher estimate of the echo signal than the echo signal estimate 130 output by the adaptive echo cancellation filter 108.

Figure 3:
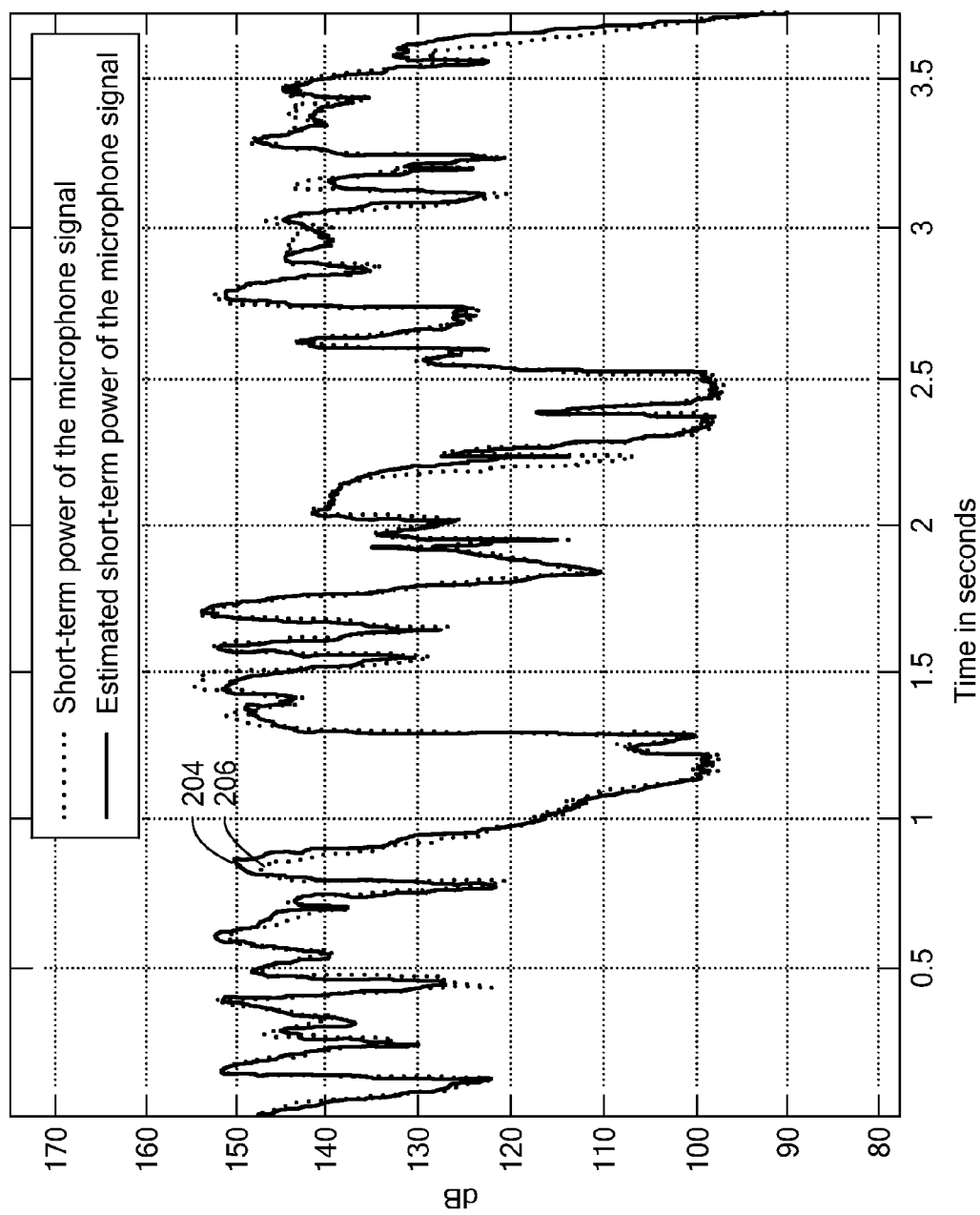
FIG. 3 is a chart comparing the loudspeaker output power estimate from the infinite impulse response filter and the corresponding actual short term power of the loudspeaker output recorded at the microphone.

Soft limiter 118 includes a short-term power estimation stage 114 and a gain computation stage 116. The loudspeaker output estimate 132 output from the low order IIR filter 112 is applied first to the short-term power estimation stage 114. The short-term power estimation stage 114 calculates the short-term power of the loudspeaker output estimate 132. The short-term power estimation stage 114 squares the loudspeaker output estimate 132 and applies the squared estimate to a first order IIR filter for smoothing. The resulting signal provides a sufficiently accurate estimate of the output power of the loudspeaker 104 that will be received at microphone 106. FIG. 3 shows a comparison between a short-term power estimate 204 calculated as just described, and the corresponding actual short-term power 206 received at microphone 106. As can be seen, the two curves are closely matched, confirming the reliability of the described method for generating the loudspeaker output short-term power estimate.

Having a reliable short-term power estimate, it is possible to determine whether the estimated loudspeaker output signal will exceed the clipping threshold of the microphone stage, and if so by what amount. Based on the short-term power estimate and its relation to the clipping threshold, the attenuation necessary to limit the loudspeaker output to a level that will not be clipped at the microphone can be determined. The gain computation stage 116 calculates the signal gain that must be applied by soft limiter 118 to the received audio signal 122 before it can be played over loudspeaker 104 without fear that it will be clipped at microphone 106.

Soft limiter 118 attenuates the received audio signal 122 as determined by the gain computation stage 116. The soft limiter output supplies the Line-Out signal 126 to the loudspeaker 104 and the reference signal to echo cancellation filter 108. Thus, the output of loudspeaker 104 is limited to levels that will not cause clipping at microphone 106. The transfer function of the LEM system remains linear, and acoustic echo is effectively removed from the audio transmit signal 124 before it is sent to a remote device by transceiver 102.

Figure 4:
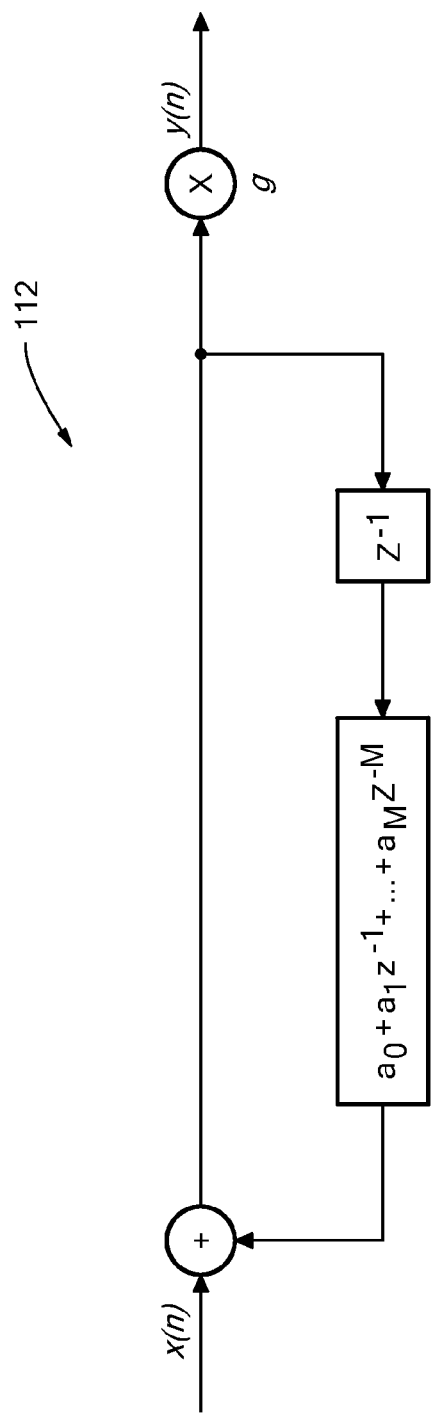
FIG. 4 shows the structure of an infinite impulse response filter employed in an embodiment of the invention.

As mentioned above, the coefficients for the low order IIR filter 112 can be derived from the adaptive echo cancellation filter 108. This is represented by the coefficient computation stage 110 in FIG. 1. The structure of the low order IIR filter 112 is shown in FIG. 4. The IIR filter 112 has the structure of an inverse prediction error filter. The filter coefficients can be computed using the Levinson-Durbin recursion algorithm to guarantee filter stability.

Computing the filter coefficients begins with the computation of the autocorrelation function $r_i(n)$ at lag i of the filter coefficients of the echo cancellation vector h(n) generated by the adaptive echo cancellation filter 108. In the case of time domain echo cancellation:

$$r_i(n) = \frac{1}{N-1} \sum_{m=0}^{N-1-i} h_m(n) h_{m+i}(n).$$

where $$h(n) = [h_0(n), h_1(n), \ldots, h_{N-1}(n)]^T$$

The coefficients $r_i(n)$ are transformed into the low order filter coefficients by solving the linear equation system:

$$\begin{bmatrix} r_0(n) & r_1(n) & \cdots & r_M(n) \\ r_1(n) & r_0(n) & \cdots & r_{M-1}(n) \\ \vdots & \vdots & \ddots & \vdots \\ r_M(n) & r_{M-1}(n) & \cdots & r_0(n) \end{bmatrix} \begin{bmatrix} a_0 \\ a_1 \\ \vdots \\ a_m \end{bmatrix} = \begin{bmatrix} r_1(n) \\ r_2(n) \\ \vdots \\ r_{M+1}(n) \end{bmatrix}.$$

which may be solved using of the Levinson-Durbin recursion algorithm.

If the echo cancellation is performed in a sub-bands using analysis and synthesis filter banks the computation of the coefficients $r_i(n)$ start with computing the sum of the squared magnitudes of all coefficients in each sub-band of the echo cancellation filter 108. The result of this operation is a vector with non-negative elements. This vector is transformed via can IDFT into the time-domain. Due to the real elements, only the cosine terms of the twiddle factors need to be computed. Furthermore, only the first M (M=the filter order of the IIR filter) bins need to be computed. Afterwards the same computation as in the case of a time-domain echo cancellation filter is performed.

For implementations where it is necessary to reduce the number of calculations, an alternative method for calculating the IIR filter coefficients may be considered. Instead of calculating low-order IIR filter coefficients for the calculation of the loudspeaker output estimate 132 for a given input reference signal y(n) for x(n), the IIR filter can be replaced with a scalar value. For example, the scaler may be the sum of all squared filter coefficients in the echo cancellation filter 108.

In another alternative it is possible to extend the full-band implementation described above to individual frequency bands. With this approach it is possible to limit only those frequencies that are above the critical clipping threshold. In this arrangement the structure of the soft limiter 18 remains the same as shown in FIG. 1, except that in this multi-band variation there are independent limiters configured for each low-order sub-band (e. g. psycho-acoustically motivated critical sub-bands). In each critical band, the LEM system would be represented by a scalar which is the sum of the squared echo cancellation filter coefficients of all sub-bands belonging to the critical band.

To achieve even greater frequency resolution, independent limiters may be implemented for every sub-band computed in the frequency sub-band analysis of the reference signal. The LEM sub-band would then be a scalar which is a sum of the squared echo cancellation filter coefficients in the band.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for limiting an output signal to a speaker in a communication system having a speaker and a microphone, the system comprising: an echo power estimator for estimating audio power received at the microphone when the output signal is reproduced by the speaker; and a limiter adapted to limit the output signal to the speaker when the estimated audio power received at the microphone exceeds a threshold.

2. The system of claim 1 wherein the threshold corresponds to an audio power level above which audio signals transduced by the microphone are clipped.

3. The system of claim 1 wherein the echo power estimator comprises a model of a transfer function from the speaker to the microphone.

4. The system of claim 3 where the model comprises a low order infinite impulse response filter.

5. The system of claim 4 wherein coefficients for the low order infinite impulse filter are derived from an adaptive echo cancellation filter.

6. The system of claim 3 wherein the model comprises a scalar quantity calculated by summing the square of each of a plurality of adaptive echo cancellation filter coefficients.

7. The system of claim 1 where in the echo power estimate is adapted to estimate the audio power of the speaker output in various frequency sub-bands and the limiter is adapted to limit individual frequency sub-bands of the output signal to the speaker.

8. A communication system comprising: a transceiver for receiving and transmitting audio signals; a loudspeaker for reproducing audio signals received by the transceiver; a microphone for transducing sounds into audio signals to be transmitted by the transceiver; power estimation circuitry adapted to generate an audio power of estimate of the audio power expected to be received at the microphone when a received audio signal is reproduced by the loudspeaker; and a limiter for limiting the received audio signal when the audio power estimate exceeds a threshold value.

9. The communication system of claim 8 wherein the threshold value corresponds an audio power level at which audio signals transduced by the microphone are clipped.

10. The communication system of claim 8 further comprising echo cancellation circuitry for filtering a portion of the audio signals transduced by the microphone to remove portions of the transduced audio signal that are the result of the microphone picking up the loudspeaker output.

11. The communication system of claim 10 wherein the limiter acts to limit the loudspeaker output to a dynamic range in which the audio transfer characteristics from the loudspeaker through the microphone remain linear.

12. The communication system of claim 10 wherein the echo cancellation circuitry comprises an adaptive filter.

13. The communication system of claim 12 wherein the power estimation circuitry comprises a low order infinite impulse response filter having coefficients derived from the echo cancellation adaptive filter.

14. The communication system of claim 8 wherein the power estimation circuitry is adapted to estimate the audio power received at the microphone in a plurality of different frequency sub-bands, and the limiter is adapted to individually limit a plurality of frequency sub-bands of the output signal to the loudspeaker.

15. An echo canceling system comprising: a transceiver; a loudspeaker for reproducing a received audio signal received by the transceiver; a microphone for transducing local sounds into a transmit audio signal to be transmitted by the transceiver; echo cancellation circuitry configured to remove an echo signal comprising sounds reproduced by the loudspeaker and picked up by the microphone to determine an audio transfer signal from the audio signal transduced by the microphone; and limiting circuitry configured to limit the audio signal reproduced by the loudspeaker such that the echo signal is not clipped at the microphone based on the audio signal reproduced by the loudspeaker alone.

16. The echo canceling system of claim 15 wherein echo cancellation circuitry comprises an adaptive filter.

17. The echo cancellation system of claim 16 further comprising a model of a spectral envelope of a loudspeaker-enclosure-microphone system comprising the loudspeaker, the microphone and a surrounding environment in which they are placed.

18. The echo cancellation system of claim 17 wherein the model of the spectral envelope of the loudspeaker-enclosure-microphone system comprises a low order infinite impulse response filter having coefficients derived from the echo cancellation adaptive filter.

19. The echo cancellation system of claim 17 wherein the model of the spectral envelope of the loudspeaker-enclosure-microphone system comprises a scalar value calculated by squaring and summing the coefficients of the echo cancellation adaptive filter.

20. The echo cancellation system of claim 15 wherein the limiting circuitry is adapted to individually limit different frequency sub-bands within the received audio signal.

21. An echo canceling system comprising: a loudspeaker for reproducing a received audio signal; a microphone for transducing a local audio signal; an echo cancellation filter for estimating an echo signal based on the audio signal reproduced by the loudspeaker picked up by the microphone, and filtering the echo signal from the local audio signal; and limiting circuitry for limiting the received audio signal to a level below that which will cause clipping at the microphone based on the audio signal reproduced by the loudspeaker alone.

22. The echo cancellation system of claim 21 wherein the limiting circuitry includes a low order infinite impulse response filter having coefficients derived from the echo cancellation filter.

23. The echo cancellation system of claim 21 wherein the limiting circuitry comprises a model of an audio transfer function between the loudspeaker and microphone.

24. The echo cancellation system of claim 23 wherein the model comprises a scalar deriver from coefficients of the echo cancellation filter.

25. The echo cancellation system of claim 21 wherein said limiting circuitry is adapted to individually limit a plurality of different frequency sub-bands of the received audio signal.

26. A method of canceling echo in a communication system having a loudspeaker and a microphone, the method comprising: receiving an audio signal; determining a short-term power estimate of the audio power that would be received at the microphone if the received audio signal were played over the loudspeaker; comparing the short-term power estimate to a received power threshold known to cause clipping at the microphone; limiting the received audio signal if the short-term power estimate exceeds the received power threshold.

27. The method of claim 26 wherein limiting the received audio signal comprises limiting individual frequency sub-bands of the received audio signal.

28. The method of claim 26 wherein estimating the echo signal from the loudspeaker that will be picked up by the microphone comprises applying the received audio signal to a low order infinite impulse response.

29. The method of claim 26 wherein the step of filtering the estimated echo signal from an audio signal picked up by the microphone comprises subtracting the output of the adaptive echo cancellation filter from the microphone pick up signal.

* * * * *